(12) United States Patent
Strosser et al.

(10) Patent No.: US 7,277,785 B2
(45) Date of Patent: Oct. 2, 2007

(54) APPARATUS AND METHOD TO CALIBRATE A DRAPER ON AN AGRICULTURAL HEADER ON AN AGRICULTURAL WINDROWER

(75) Inventors: Richard P. Strosser, Akron, PA (US); Philip J. Ehrhart, Narvon, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/487,920

(22) Filed: Jul. 17, 2006

(65) Prior Publication Data

US 2007/0012014 A1    Jan. 18, 2007

Related U.S. Application Data

(60) Provisional application No. 60/699,551, filed on Jul. 15, 2005.

(51) Int. Cl.
G06F 7/70 (2006.01)

(52) U.S. Cl. ................. 701/50; 56/10.2 R

(58) Field of Classification Search .......... 701/36, 701/50, 70; 180/53.6–53.8; 56/10.2 R, 56/10.2 A, 10.2 GF, 10.2 H
See application file for complete search history.

(56) References Cited

U.S. PATENT DOCUMENTS

| | | | |
|---|---|---|---|
| 4,414,792 A | 11/1983 | Bettencourt et al. | ......... 56/10.2 |
| 4,527,241 A | 7/1985 | Sheehan et al. | ............ 364/424 |
| 4,573,124 A | 2/1986 | Seiferling | .................... 364/424 |
| 4,967,544 A | 11/1990 | Ziegler et al. | ............... 56/10.2 |
| 5,005,342 A | 4/1991 | Lundahl et al. | .............. 56/10.2 |
| 5,359,836 A | 11/1994 | Zeuner et al. | ............... 56/10.2 |
| 5,463,854 A | 11/1995 | Chmielewski, Jr. et al. | . 56/10.2 |
| 5,524,424 A | 6/1996 | Halgrimson et al. | ..... 56/10.2 D |
| 5,535,577 A | 7/1996 | Chmielewski et al. | ....... 56/10.2 |
| 5,704,200 A | 1/1998 | Chmielewski, Jr. et al. | ....................... 56/10.2 E |
| 6,112,139 A | 8/2000 | Schubert et al. | ............... 701/2 |
| 6,151,874 A * | 11/2000 | Eis | ......................... 56/10.2 E |
| 6,202,395 B1 | 3/2001 | Gramm | .................... 56/10.2 E |
| 6,546,705 B2 | 4/2003 | Scarlett et al. | ........... 56/10.2 R |
| 6,591,591 B2 | 7/2003 | Coers et al. | ............. 56/10.2 G |
| 6,826,894 B2 | 12/2004 | Thiemann et al. | ........ 56/10.2 E |
| 6,865,870 B2 | 3/2005 | Heisey | ..................... 56/10.2 G |
| 6,901,729 B1 | 6/2005 | Otto et al. | ..................... 56/208 |
| 7,168,229 B1 * | 1/2007 | Hoffman et al. | .............. 56/208 |

* cited by examiner

*Primary Examiner*—Richard M. Camby
(74) *Attorney, Agent, or Firm*—John William Stader; Michael G. Harms; Patrick M. Sheldrake

(57) ABSTRACT

An apparatus and method for calibrating a PTO for driving a header of an agricultural windrower, wherein a programmable control module in connection with at least signal operated device in operative control of a variable displacement pump operable for controlling operation of the PTO, is programmed as part of an automatic calibration routine for determining values for the control signals required for operating the header at a predetermined target speed for a plurality or range of speeds of an engine driving the pump, such at the pump can be controlled to minimize occurrences of overpumping of fluid and resultant problems.

16 Claims, 29 Drawing Sheets

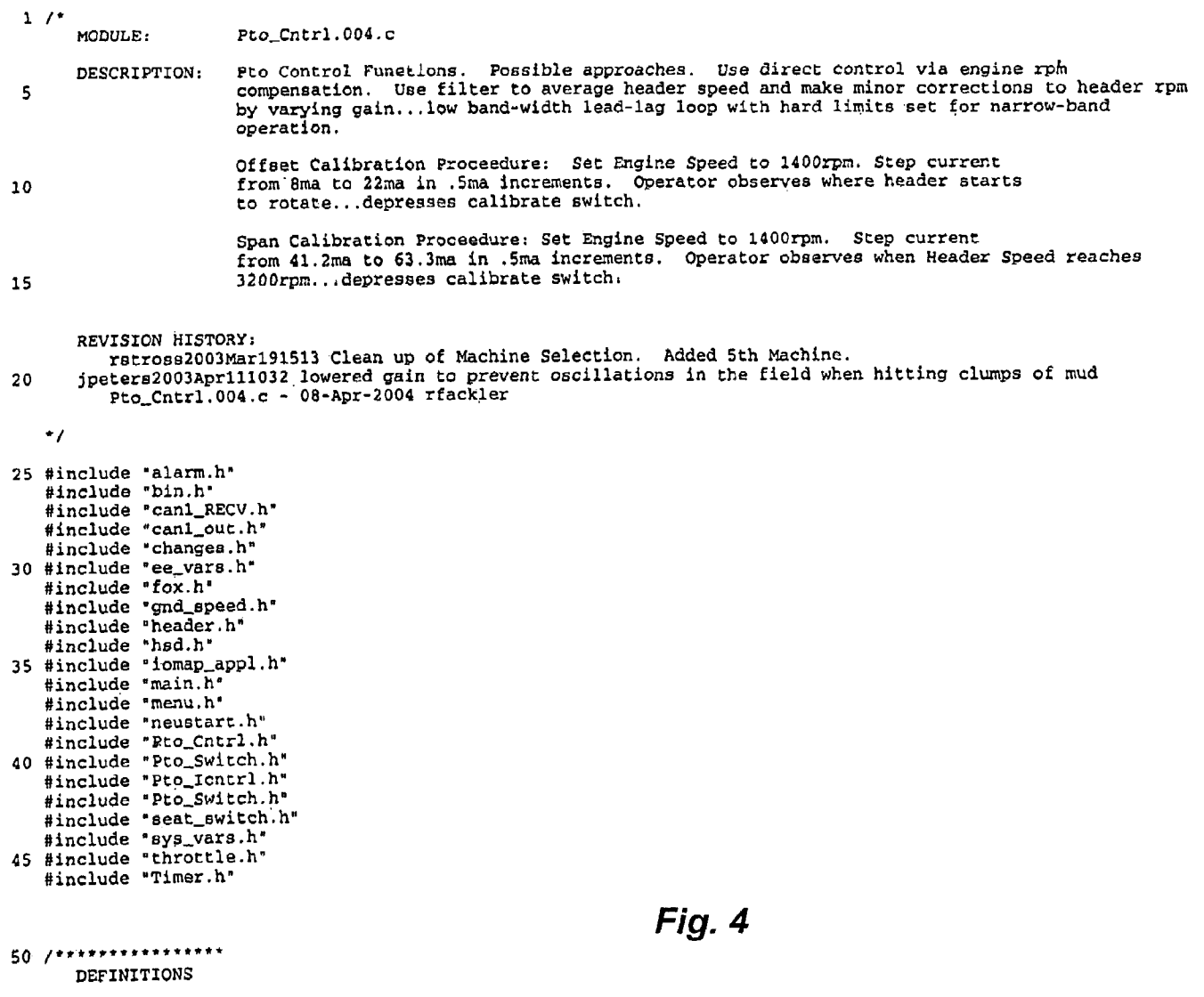

```
1 /*   MODULE:         Pto_Cntrl.004.c

DESCRIPTION:    Pto Control Functions.  Possible approaches.  Use direct control via engine rph
                      compensation.  Use filter to average header speed and make minor corrections to header rpm
5                     by varying gain...low band-width lead-lag loop with hard limits set for narrow-band
                      operation.

Offset Calibration Proceedure:  Set Engine Speed to 1400rpm. Step current
                      from 8ma to 22ma in .5ma increments. Operator observes where header starts
10                    to rotate...depresses calibrate switch.

Span Calibration Proceedure: Set Engine Speed to 1400rpm. Step current
                      from 41.2ma to 63.3ma in .5ma increments. Operator observes when Header Speed reaches
15                    3200rpm...depresses calibrate switch.

REVISION HISTORY:
        rstross2003Mar191513 Clean up of Machine Selection. Added 5th Machine.
        jpeters2003April11032 lowered gain to prevent oscillations in the field when hitting clumps of mud
20      Pto_Cntrl.004.c - 08-Apr-2004 rfackler

*/

25  #include "alarm.h"
    #include "bin.h"
    #include "can1_RECV.h"
    #include "can1_out.h"
    #include "changes.h"
30  #include "ee_vars.h"
    #include "fox.h"
    #include "gnd_speed.h"
    #include "header.h"
    #include "hsd.h"
35  #include "iomap_appl.h"
    #include "main.h"
    #include "menu.h"
    #include "neustart.h"
    #include "Pto_Cntrl.h"
40  #include "Pto_Switch.h"
    #include "Pto_icntrl.h"
    #include "Pto_Switch.h"
    #include "seat_switch.h"
    #include "sys_vars.h"
45  #include "throttle.h"
    #include "Timer.h"

50  /******************
       DEFINITIONS
```

Fig. 4

```
/****************/
// CONSTANT
        #define  __v_MAX_RPM_b0    velocity_rpm_b0_ui( 3200.0 )

// ENUMERATIONS
enum _pto_states(
        _OFF,              //state 0
        _VFWD,             //state 1
        _VREV,             //state 2
        _IFWD,             //state 3
        _IREV,             //state 4
        _FWD_ON,           //state 5
        _REV_ON            //state 6
);

enum _pto_cal_states(
        _PTO_CAL_STATE_INIT,                          //state 0
        _PTO_CAL_STATE_BEGIN,                         //state 1
        _PTO_CAL_STATE_START_ENGINE,                  //state 2
        _PTO_CAL_STATE_WAIT_FOR_ENG_RUNNING,          //state 3
        _PTO_CAL_STATE_CHECK_FOR_HI_IDLE,             //state 4
        _PTO_CAL_STATE_WAIT_FOR_HI_IDLE,              //state 5
        _PTO_CAL_STATE_WAIT_FOR_PTO_SWITCH,           //state 6
        _PTO_CAL_STATE_CALIBRATING,                   //state 7
        _PTO_CAL_STATE_FWD_OFFSET,                    //state 8
        _PTO_CAL_STATE_FWD_MAX,                       //state 9
        _PTO_CAL_STATE_FWD_MAX_01,                    //state 10
        _PTO_CAL_STATE_FWD_MAX_02,                    //state 11
        _PTO_CAL_STATE_FWD_MAX_03,                    //state 12
        _PTO_CAL_STATE_FWD_MAX_04,                    //state 13
        _PTO_CAL_STATE_FWD_MAX_05,                    //state 14
        _PTO_CAL_STATE_FWD_MAX_06,                    //state 15
        _PTO_CAL_STATE_FWD_MAX_07,                    //state 16
        _PTO_CAL_STATE_CHANGE_DIRECTION,              //state 17
        _PTO_CAL_STATE_REV_OFFSET,                    //state 18
        _PTO_CAL_STATE_REV_MAX,                       //state 19
        _PTO_CAL_STATE_CHECK_CONFIG,                  //state 20
        _PTO_CAL_STATE_FAILED,                        //state 21
        _PTO_CAL_STATE_SUCCESSFUL,                    //state 22
        _PTO_CAL_STATE_EXIT,                          //state 23
        _PTO_CAL_STATE_ENGINE_SETTLE,                 //state 24
        _pto_cal_state_DRAPER_CAL_INIT,               //state 25
        _pto_cal_state_DRAPER_02,                     //state 26
        _pto_cal_state_DRAPER_03,                     //state 27
        _pto_cal_state_DRAPER_04,                     //state 28
        _pto_cal_state_DRAPER_05,                     //state 29
        _pto_cal_state_DRAPER_06,                     //state 30
        _pto_cal_state_DRAPER_07,                     //state 31
        _PTO_CAL_STATE_SHOW_REV_MAX                   //state 32
```

Fig. 5

```
105     // UNITS

/*****************
        MAPPING
110     *****************/

// REFERENCES:
           #define  _step_time         _time_b0_ui2scans_sec_f( 0.10 )
           #define  _hold_time         _time_b0_ui2scans_sec_f( 3.0 )

115     // INPUTS: DIGITAL - POSITIVE LOGIC...ON = NON-ZERO...OFF = 0.
           #define  _hdr_emerg_stop_debounced     Iomap_digin_swstate_s17_hdr_pto_emerg_stop.debounced // INPUTS: ANALOG
120        #define  _v_pto_rpm_b0       (Header_v_pto_rpm_b0.filtered)
           #define  _v_setpt_rpm_b0     Pto_control_parameter_b0_ui
           #define  _i_setpt_ma_b3_si   Pto_control_parameter_b0_ui 125     // OUTPUTS: DIGITAL - POSITIVE LOGIC...ON = NON-ZERO...OFF = 0.
           #define  _low_side_for_PTO_power_relay_on   Iomap_LSDout_K23_low_side_for_PTO_power=0
           #define  _low_side_for_PTO_power_relay_off  Iomap_LSDout_K23_low_side_for_PTO_power=1

130     // OUTPUTS: PWM TYPE

/*****************
        VARIABLES
        *****************/

135     // GLOBAL SCOPE
           signed int EE_pto_fwd_offset_current_ma_b3_si;
           signed int EE_pto_fwd_max_current_ma_b3_si;
           signed int EE_pto_rev_offset_current_ma_b3_si;
           signed int EE_pto_rev_max_current_ma_b3_si;

140     // MODULE SCOPE
           static unsigned char   _interactive_cal_proceed_flag_b0_uc;
           static unsigned int    _state_prev;
145        static unsigned int    _i_out_ma_b3_si;
           static unsigned int    _i_out_fwd_ma_b3_si;
           static unsigned int    _i_out_rev_ma_b3_si;
           static unsigned int    _i_max_ma_b3_si;
           static unsigned int    _i_offset_ma_b3_si;
150        static unsigned int    _i_calc_fwd_ma_b3_si;
           static unsigned int    _i_calc_rev_ma_b3_si;
           static signed long     _integrator_b12;
```

//jpeters2004Jun2

*Fig. 6*

```
155         static      signed int              _pto_cal_value_ma_b3_si;
            static      enum _pto_states        _pto_state;
            static      enum _pto_cal_states    _pto_cal_state_b0_ui;
            static      unsigned int            _prev_pto_cal_state_b0_ui;
            static      signed long             _Pcontrol_b12, _Icontrol_b12, _Dcontrol_b12;

160         //jpeters2003Jul080752 Current step test
            static      signed int              _fwd_ltest, _rev_ltest;
            static      unsigned int            _timer01, _timer02, _timer03;
            static      unsigned int            _prev_header_rpm_b0_si;

165         LONG_FILTER  __eng_rpm_b0;

static struct UFOX_FN FN1() =
            (
                (     0,  0 ),
170             ( 1300,  0 ),
                ( 1400,  0 ),
                ( 1500,  0 ),
                ( 1600,  0 ),
                ( 1700,  0 ),
175             ( 1800,  0 ),
                ( 1900,  0 ),
                ( 2000,  0 ),
                ( 2100,  0 ),
                ( 65535, 0 )
180         );

unsigned int _throttle_setpt_rpm_b0_ui;

185     /***************
            FUNCTION PROTOTYPING - MODULE SCOPE
        ****************/ static  void        _pto_cntrl_init( void );
            static  void        _pto_cntrl_main( void );
190         static  void        _pid( void );
            static  void        _pto_calibrate( void );
            static  signed int  _pto_disc_setpt_to_current_ma_b3_si( signed int );
            static  unsigned int _rpm_to_i                                          (unsigned int x);
195         static  signed int  _pto_draper_setpt_to_current_ma_b3_si ( void );

/******************************************************************/
        bit pto_cntrl( const unsigned int machine_mode_b0_ui )
        (
200         //CAN_test_data[0].word = Pto_Icntrl_meas;
            //CAN_test_data[1].word = Header_v_pto_rpm_b0.filtered;
            //CAN_test_data[2].word = Pto_control_parameter_b0_ui;
            //CAN_test_data[3].word = engine_v_eng_rpm_b0.filtered;
```

*Fig. 7*

```
205  //CAN_test_data2[0].word = _pto_disc_setpt_to_current_ma_b3_si( _v_setpt_rpm_b0 );

//CAN_test_data2[0].word = EE_pto_fwd_offset_current_ma_b3_si;
     //CAN_test_data2[1].word = EE_pto_fwd_max_current_ma_b3_si;
210  //CAN_test_data2[2].word = EE_pto_rev_offset_current_ma_b3_si;
     //CAN_test_data2[3].word = EE_pto_rev_max_current_ma_b3_si;

215  switch( machine_mode_b0_ui )
     {
      case INIT_main_STATE_MACHINE:
      case CRITICAL_EE_VARS_OUT_OF_BOUNDS:
      case WAKEUP_TEST_OUTPUTS:
220   case WAKEUP_LIGHTS_ONLY:
      case NORMAL_ENGINE_OFF:
      case NORMAL_ENGINE_STARTING:
      case DIAG_N_SETUP_ENGINE_OFF:
      case POWER_DOWN:
225   case XCM_SETUP:
           _low_side_for_PTO_power_relay_off;          //Force LSD off as normal condition
           return(0);                                  // signify a normal return case WAKEUP_APPLICATION_INIT:
230        _pto_cntrl_init();
           return(0);                                  // signify a normal return case NORMAL_ENGINE_RUNNING:
235        if(!in_header_remove_mode_b_xp)              //jpeters2004Jun031048 Don't operate PTO in Header Remove Mode
              _pto_cntrl_main();
           return(0);                                  // signify a normal return case CALIBRATION_ENGINE_STARTING:
240   case CALIBRATION_ENGINE_RUNNING:
           pto_calibrate();
           return(0);
     }
     }
245  /************************************************************/
     bit pto_cntrl_ee_validation(void)
     {
250  /*
      This needs more work.  Need to store these as unsigned ints (with offset) and then after they are recalled
      the user module will remove the offset and use it as a signed int.  If there is a problem with any of these 4
      registers we want to change the out-of-bounds register to 0xfe00 and have this function return a value other t
      Then the main state machine should hang up in the CRITICAL_EE_VARS_OUT_OF_BOUNDS state which will force a reca
255   strategy.
```

Fig. 8

```
         */
         EE_pto_fwd_offset_current_ma_b3_si = (signed int)( (unsigned int)(ee_pto_fwd_offset_current_ma_b3_ui) - ( 4000
         EE_pto_fwd_max_current_ma_b3_si    = (signed int)( (unsigned int)(ee_pto_fwd_max_current_ma_b3_ui)    - ( 400  * BIN
260      EE_pto_rev_offset_current_ma_b3_si = (signed int)( (unsigned int)(ee_pto_rev_offset_current_ma_b3_ui) - ( 4000
         EE_pto_rev_max_current_ma_b3_si    = (signed int)( (unsigned int)(ee_pto_rev_max_current_ma_b3_ui)    - ( 400  * BIN

// TBD APRIL 8 - THIS NEEDS TO BE FINISHED 265      if( ( EE_pto_fwd_offset_current_ma_b3_si < current_ma_b3_si(  5 ) ) || ( EE_pto_fwd_offset_current_ma_b3_  i > cu
            put_ee_pto_fwd_offset_current_ma_b3_si( current_ma_b3_si( 26 ) );
         if( ( EE_pto_fwd_max_current_ma_b3_si    < current_ma_b3_si( 50 ) ) || ( EE_pto_fwd_max_current_ma_b3_si > curr
            put_ee_pto_fwd_max_current_ma_b3_si( current_ma_b3_si( 103 ) );
         if( ( EE_pto_rev_offset_current_ma_b3_si < current_ma_b3_si(  5 ) ) || ( EE_pto_rev_offset_current_ma_b3_  i > cu
270         put_ee_pto_rev_offset_current_ma_b3_si( current_ma_b3_si( 31 ) );
         if( ( EE_pto_rev_max_current_ma_b3_si    < current_ma_b3_si( 10 ) ) || ( EE_pto_rev_max_current_ma_b3_si > urrent
            put_ee_pto_rev_max_current_ma_b3_si( current_ma_b3_si( 69 ) );

275      #define _ee_draper_val( __var, __i_def )       if( ( __var < current_ma_b3_ui( __i_def-15.0 ) ) || ( __va > cur
                                                          __var = current_ma_b3_ui( __i_def )
            _ee_draper_val( ee_draper_1300_cal, 61.0 );
            _ee_draper_val( ee_draper_1400_cal, 57.0 );
            _ee_draper_val( ee_draper_1500_cal, 56.0 );
            _ee_draper_val( ee_draper_1600_cal, 54.0 );
280         _ee_draper_val( ee_draper_1700_cal, 52.0 );
            _ee_draper_val( ee_draper_1800_cal, 50.0 );
            _ee_draper_val( ee_draper_1900_cal, 48.0 );
            _ee_draper_val( ee_draper_2000_cal, 47.0 );
            _ee_draper_val( ee_draper_2100_cal, 45.0 );

285      #undef _ee_draper_val 290      return(0);       // do this for now
         }

/******************************************************/
         void put_ee_pto_fwd_offset_current_ma_b3_si( signed int __X )
         {
295         EE_pto_fwd_offset_current_ma_b3_si = __X;
            ee_pto_fwd_offset_current_ma_b3_ui = (unsigned int)( __X + ( 4000 * BIN3 ) );
         }
         /******************************************************/
300      void put_ee_pto_fwd_max_current_ma_b3_si( signed int __X )
         {
            EE_pto_fwd_max_current_ma_b3_si = __X;
            ee_pto_fwd_max_current_ma_b3_ui = (unsigned int)( __X + ( 4000 * BIN3 ) );
         }
305      /******************************************************/
```

Fig. 9

```
     void put_ee_pto_rev_offset_current_ma_b3_si( signed int __X )
     {
310      EE_pto_rev_offset_current_ma_b3_si  = __X;
         ee_pto_rev_offset_current_ma_b3_ui  = (unsigned int)( __X + ( 4000 * BIN3 ) );
     }
     /****************************************************************/
     void put_ee_pto_rev_max_current_ma_b3_si( signed int __X )
     {
315      EE_pto_rev_max_current_ma_b3_si  = __X;
         ee_pto_rev_max_current_ma_b3_ui  = (unsigned int)( __X + ( 4000 * BIN3 ) );
     }
320  /****************************************************************/
     static void _pto_cntrl_init( void )
     {
325      _fwd_ltest = _rev_ltest = 0;
         _timer01 = _timer02 = _timer03 = 0;
         _pto_state = _state_prev = _OFF;

330      FN1[0].y = ee_draper_1300_cal;
         FN1[1].y = ee_draper_1300_cal;
         FN1[2].y = ee_draper_1400_cal;
         FN1[3].y = ee_draper_1500_cal;
         FN1[4].y = ee_draper_1600_cal;
         FN1[5].y = ee_draper_1700_cal;
335      FN1[6].y = ee_draper_1800_cal;
         FN1[7].y = ee_draper_1900_cal;
         FN1[8].y = ee_draper_2000_cal;
         FN1[9].y = ee_draper_2100_cal;
         FN1[10].y = ee_draper_2100_cal;
340  #ifdef DATA_ACQ_GET_DRAPER_CAL  //rps2004nov101028
         CAN_test_data[0].word = ee_draper_1300_cal;;
         CAN_test_data[1].word = ee_draper_2100_cal;
345  #endif
     }
350  /****************************************************************/
     static void _pto_cntrl_main(void)
     {
         static unsigned char _pto_fwd_state_b0_uc;
355
         #define  _pto_fwd_state_init    0
         #define  _pto_fwd_state_iramp   1
```

Fig. 10

```
#define  _pto_fwd_state_hold      2
#define  _pto_fwd_state_pid       3

_pto_state = Pto_control_state_b0_uc;

// Output current defaulted to 0 ma:
_i_out_fwd_ma_b3_si = _i_out_rev_ma_b3_si = 0;

// State Machine if( _pto_state != _state_prev)
{
    //jpeters2004Aug101454 correcting disc overshoot at step response
    if( _6_cyl_pto_sickle_b_xp && ( _pto_state == _VFWD) )    //sickle must be pre-charged
    {
        _integrator_b12 = BIN9*((unsigned long)current_ma_b3_si( 100 ) );
    }
    else
    {
        _integrator_b12 = 0;
    }

_pto_fwd_state_b0_uc = _pto_fwd_state_init;
    if( _pto_state == PTO_STATE_VELOCITY_FWD_ENGINE_COMP )
    {
        eng_rpm_b0.raw_ul = 2150;
        LONG_FILTER128_INIT( _eng_rpm_b0 );
    }
} switch( _pto_state )
{
    default:
    case _OFF:
        _pto_fwd_state_b0_uc = _pto_fwd_state_init;
        Pto_Icntrl_state(OFF _state_uc_Pto_ICntrl);
        break;

case _VFWD:
        Pto_Icntrl_state(CURRENT_CNTRL _state_uc_Pto_ICntrl);      //Reset the fwd icontrol loop for a current ram //jpeters2004Aug121830 Added ramp start before PID loop to avoid overshoot
        switch( _pto_fwd_state_b0_uc )
        {
            case _pto_fwd_state_init:
                _i_out_ma_b3_si = EE_pto_fwd_offset_current_ma_b3_si;
                _pto_fwd_state_b0_uc = _pto_fwd_state_iramp;
                break;
            case _pto_fwd_state_iramp:                              //Start the PTO with a slow current
                if( _i_out_ma_b3_si < EE_pto_fwd_offset_current_ma_b3_si)   //Start the ramp at the offset current
                    _i_out_ma_b3_si = EE_pto_fwd_offset_current_ma_b3_si;
```

Fig. 11

```
410     if( _i_out_ma_b3_si < EE_pto_fwd_max_current_ma_b3_si && ++_timer01 > _step_time )
        {
            _timer01=0;
415         _i_out_ma_b3_si += current_ma_b3_si( 1 );
        }
        if(
            ( ((signed int)_v_setpt_rpm_b0 - (signed int)_v_pto_rpm_b0) < (signed int)100 )   //Once the
            || (_6_cyl_pto_disc_b_xp && ( _i_out_ma_b3_si >= _pto_disc_setpt_to_current_ma_b3_si( _v_setpt
        )
        {
420         _timer01=0;                              //TBD- Add a timeout here?
            _pto_fwd_state_b0_uc = _pto_fwd_state_hold;
        }
        _i_out_fwd_ma_b3_si = _i_out_ma_b3_si;
425 break;

case _pto_fwd_state_hold:
        //if( ++_timer01 > _hold_time )
        (
430         _timer01=0;
            _integrator_b12 = ( ((signed long)( _i_out_ma_b3_si) * BIN9 ) - ( ((signed long)EE_pto_fwd_offs
            _pto_fwd_state_b0_uc = _pto_fwd_state_pid;
        )
        _i_out_fwd_ma_b3_si = _i_out_ma_b3_si;
435 break;

case _pto_fwd_state_pid:
        _i_max_ma_b3_si = EE_pto_fwd_max_current_ma_b3_si;
440     _i_offset_ma_b3_si = EE_pto_fwd_offset_current_ma_b3_si;
        _pid();
        _i_out_fwd_ma_b3_si = _i_out_ma_b3_si;
    break;

445 case _VREV:
        pto_Icntrl_state(CURRENT_CNTRL_state_uc_Pto_ICntrl);
        _i_max_ma_b3_si = EE_pto_rev_max_current_ma_b3_si;
        _i_offset_ma_b3_si = EE_pto_rev_offset_current_ma_b3_si;
450     _i_out_rev_ma_b3_si = _i_out_ma_b3_si;
    break;

case _IFWD:
        pto_Icntrl_state(CURRENT_CNTRL_state_uc_Pto_ICntrl);
        //_i_out_fwd_ma_b3_si = _pto_disc_setpt_to_current_ma_b3_si( _v_setpt_rpm_b0 );
455     _i_out_fwd_ma_b3_si = _i_setpt_ma_b3_si;
        //_i_out_fwd_ma_b3_si = current_ma_b3_si( 50 );
    break;
```

Fig. 12

```
460         case _IREV:
                Pto_Icntrl_state(CURRENT_CNTRL__state_uc_Pto_ICntrl);
                _i_out_rev_ma_b3_si = _i_setpt_ma_b3_si;
                break;

465         case _FWD_ON:
                Pto_Icntrl_state(FWD_ON__state_uc_Pto_ICntrl);
                break;

470         case _REV_ON:
                Pto_Icntrl_state(REV_ON__state_uc_Pto_ICntrl);
                break;

475         case PTO_STATE_VELOCITY_FWD_ENGINE_COMP:
                Pto_Icntrl_state(CURRENT_CNTRL__state_uc_Pto_ICntrl);
                _i_out_fwd_ma_b3_si = _pto_draper_setpt_to_current_ma_b3_si();
                break;
            }
480         _state_prev = _pto_state;

// Output current passed to Icntrl Loop:
            Pto_Icntrl_setpt(_i_out_fwd_ma_b3_si, _i_out_rev_ma_b3_si);
        }
485 /*****************************************************************/
    unsigned char pto_state_is_off_b_xp( void )
    /*
490 Description:
    */
    {
        if( _pto_state == _OFF )
            return(1);
        else
495         return(0);
    }
    /*****************************************************************/
    int* pto_get_state_pi( void )
500 {
    /*
    Description:
    */
        static int _x;
505     _x = pto_cal_state_b0_ui;
        return(&_x);
    }
    /*****************************************************************/
510 int* pto_get_cal_value_pi( void )
```

*Fig. 13*

```
      /*
      Description:
      */
515   static int __x;
      #ifdef ENGINEERING_TEST //rps2004oct261639
      __x=(((_pto_cal_value_ma_b3_si )*10)/BIN3);
      #else
      __x=(_pto_cal_value_ma_b3_si )/BIN3;
      #endif
520   return(&__x);
      }

/***************************************************************/
525   static void pto_calibrate(void)
      {
      static unsigned char  _update_display_flag_b0_uc;
      static const void*    _pto_cal_msg;
530   static signed int     _i_inc;
      static signed long    _sum_header_rpm_b0_sl;
      static signed int     _header_max_test_rpm_b0_sl;
      static signed int     _header_test_rpm_b0_sl;
      static signed int     _draper_max_t_scans_b0_ui;

535   #define  _itest_max      current_ma_b3_si( 170 )
      #define  _initwait       _time_b0_ui2scans_sec_f( 3 )
      #define  _calwait        _time_b0_ui2scans_sec_f( 3.0 )
      #define  _cal_step       _time_b0_ui2scans_sec_f( 1.0 )

540   switch( _pto_cal_state_b0_ui )
      {
         case _PTO_CAL_STATE_INIT:          //Wait here until PTO Calibration is requested
545         _fwd_itest = _rev_itest = _timer01 = _timer02 = _timer03 = _pto_cal_value_ma_b3_si = 0;
            return;

case _PTO_CAL_STATE_BEGIN:
            _fwd_itest = _rev_itest;
550         //Display a message here warning the operator before proceeding with cal that PTO will turn.
            //Operator can also choose exit to stop the calibration
            _pto_cal_msg = _pto_cal_running_menu;
            if ( ++_timer02 > _initwait )
            {
555            _timer02=0;
               _pto_cal_msg = _cal_start_eng_menu;
               _pto_cal_state_b0_ui = _PTO_CAL_STATE_START_ENGINE;
            }
            if( _4_cylinder_b_xp )    //TBD - jpeters2004Jun021332 Change cal menu to only display pto Cal for 6D m
            {
560            _pto_cal_state_b0_ui = _PTO_CAL_STATE_CHECK_CONFIG;
```

Fig. 14

```
          _timer02=0;
       )
565    break;

case _PTO_CAL_STATE_START_ENGINE:
          if( NeuStart_status_bt_xp() )
          {
570         menu_change_focus( _cal_start_eng_menu, _type_menu_e );
            _pto_cal_state_b0_ui = _PTO_CAL_STATE_WAIT_FOR_ENG_RUNNING;
          }
          else
          {
575         menu_change_focus( get_neustart_message(), _type_menu );
          )
       break;

case _PTO_CAL_STATE_WAIT_FOR_ENG_RUNNING:
          if( !pto_cal_state_bt_xp() )
580         _pto_cal_state_b0_ui = _PTO_CAL_STATE_START_ENGINE;
          if( engine_running_b_xp )
          {
            _timer02 = 0;
585         _pto_cal_state_b0_ui = _PTO_CAL_STATE_CHECK_FOR_HI_IDLE;
          }
       break;

case _PTO_CAL_STATE_CHECK_FOR_HI_IDLE:
          throttle_set_point( 1300 );             //Set Engine Speed to 1300 rpm
590       if( ++_timer02 >= 200 )                 //Delay (2) Seconds to allow Engine to settle
          {
            _timer02 = 0;
            _pto_cal_state_b0_ui = _PTO_CAL_STATE_WAIT_FOR_PTO_SWITCH;
          }
595    break;

case _PTO_CAL_STATE_WAIT_FOR_PTO_SWITCH:
          _low_side_for_PTO_power_relay_on;       //turn on LSD to look for PTO switch
          pto_cal_msg = _pto_cal_wait_menu;
600       if( _hdr_emerg_stop_debounced )
          {
            _pto_cal_state_b0_ui = _PTO_CAL_STATE_CALIBRATING;
          }
       break;

605    case _PTO_CAL_STATE_CALIBRATING:
          _low_side_for_PTO_power_relay_on;       //turn on LSD to look for PTO switch
          pto_cal_msg = _pto_cal_start_warning_menu;
          // TBD  Display some sort of message here warning the operator of the calibration mode.  PTO may begin
          if( ++_timer02 > _calwait )
610       {
            _timer02=0;
```

*Fig.15*

```
         if( _6_cyl_pto_draper_b_xp )
            _pto_cal_state_b0_ui = _pto_cal_state_DRAPER_CAL_INIT;
615      else
            _pto_cal_state_b0_ui = _PTO_CAL_STATE_FWD_OFFSET;   //Disc or Sickle Header PTO Calibration
         }

//TBD - jpeters2004Jun101332 should seat switch state machine run in calibration mode?
620      if( !_hdr_emerg_stop_debounced || !seat_switch_bt_xp )
         {
            _timer02=0;
            _pto_cal_state_b0_ui = _PTO_CAL_STATE_FAILED;
         }
625      break;

case _PTO_CAL_STATE_FWD_OFFSET:
            _low_side_for_PTO_power_relay_on;           //turn on LSD to look for PTO switch
            _pto_cal_msg = _pto_cal_running_menu;
630         _rev_itest=0;
            if(_fwd_itest <= _itest_max)
            {
               if( ++_timer02 > 20 )
               {
635               _timer02=0;
                  _fwd_itest += current_ma_b3_si( 1 );
               }
               if( ( _v_pto_rpm_b0 > 1 ) || _interactive_cal_proceed_flag_b0_uc )
               {
640               _timer02=0;
                  put_ee_pto_fwd_offset_current_ma_b3_si( _fwd_itest );
                  _pto_fwd_offset_value_ma_b3_si = EE_pto_fwd_offset_current_ma_b3_si;
                  _pto_cal_state_b0_ui = _PTO_CAL_STATE_FWD_MAX;
               }
645         }
            else
            {
               _timer02=0;
               _fwd_itest = 0;
650            _pto_state = _OFF;
               _pto_cal_state_b0_ui = _PTO_CAL_STATE_FAILED;        //If over max current reset everything
            }
            if( !_hdr_emerg_stop_debounced
655             || !seat_switch_bt_xp )
            {
               _timer02=0;
               _pto_cal_state_b0_ui = _PTO_CAL_STATE_FAILED;
            }
660      break;

case _PTO_CAL_STATE_FWD_MAX:
```

*Fig. 16*

```
        _low_side_for_PTO_power_relay_on;              //turn on LSD to look for PTO switch
665     if(_6_cyl_pto_sickle_b_xp)
          _fwd_itest = current_ma_b3_si( 75 );
        else
          _fwd_itest = current_ma_b3_si( 135 );

670     _timer02=0;
        _pto_cal_state_b0_ui = _PTO_CAL_STATE_FWD_MAX_02;
        break;
        case _PTO_CAL_STATE_FWD_MAX_02:
        _low_side_for_PTO_power_relay_on;              //turn on LSD to look for PTO switch
675     if( ++_timer02 >= _time_b0_ui2scans_sec_f(5.00) )
        {
          _timer02=0;
          _sum_header_rpm_b0_sl=0;
          _pto_cal_state_b0_ui = _PTO_CAL_STATE_FWD_MAX_03;
680     }
        break;
        case _PTO_CAL_STATE_FWD_MAX_03:
        _low_side_for_PTO_power_relay_on;              //turn on LSD to look for PTO switch
        if( ++_timer02 > _time_b0_ui2scans_sec_f(1.00) )
685     {
          _timer02=0;
          if(_6_cyl_pto_sickle_b_xp)
          {
            _header_max_test_rpm_b0_sl = (signed int)(1750 / 2.5);
690         _i_inc = current_ma_b3_si( 8*2 );
            _fwd_itest = current_ma_b3_si( 75 );
          }
          else
          {
            _header_max_test_rpm_b0_sl = (signed int)((_sum_header_rpm_b0_sl/_time_b0_ui2scans_sec_f(1.00))-25
695         _i_inc = current_ma_b3_si( 16*2 );
            _fwd_itest = current_ma_b3_si( 103 );
          }
          _timer02=0;
          _pto_cal_state_b0_ui = _PTO_CAL_STATE_FWD_MAX_05;
700     }
        else
          _sum_header_rpm_b0_sl += _v_pto_rpm_b0;
        break;
        case _PTO_CAL_STATE_FWD_MAX_04:
705     _low_side_for_PTO_power_relay_on;              //turn on LSD to look for PTO switch
        _i_inc /= 2;

if( _header_test_rpm_b0_sl > _header_max_test_rpm_b0_sl )
          _fwd_itest -= _i_inc;
710     else
          _fwd_itest += _i_inc;

if( _i_inc < current_ma_b3_si( 0.500 ) )
```

Fig. 17

```
715         _pto_cal_state_b0_ui = _PTO_CAL_STATE_FWD_MAX_07;    //Forward Max Finished
        else
        {
            _timer02=0;
720         _pto_cal_state_b0_ui = _PTO_CAL_STATE_FWD_MAX_05;
        }
        break;
    case _PTO_CAL_STATE_FWD_MAX_05:
        _low_side_for_PTO_power_relay_on;              //turn on LSD to look for PTO switch
        if( ++_timer02 >= _time_b0_ui2scans_sec_f(5.00) )
725     {
            _timer02=0;
            sum_header_rpm_b0_s1=0;
            _pto_cal_state_b0_ui = _PTO_CAL_STATE_FWD_MAX_06;
        }
730     break;
    case _PTO_CAL_STATE_FWD_MAX_06:
        _low_side_for_PTO_power_relay_on;              //turn on LSD to look for PTO switch
        if( ++_timer02 > _time_b0_ui2scans_sec_f(1.00) )
        {
735         _timer02=0;
            header_test_rpm_b0_s1 = sum_header_rpm_b0_s1/_time_b0_ui2scans_sec_f(1.00);
            _pto_cal_state_b0_ui = _PTO_CAL_STATE_FWD_MAX_04;
        }
        else
            sum_header_rpm_b0_s1 += _v_pto_rpm_b0;
740     break;
    case _PTO_CAL_STATE_FWD_MAX_07:
        _low_side_for_PTO_power_relay_on;              //turn on LSD to look for PTO switch
        put_ee_pto_fwd_max_current_ma_b3_si( _fwd_itest );
745     pto_cal_value_ma_b3_si = EE_pto_fwd_max_current_ma_b3_si;
        _fwd_itest=0;
        _timer02 = 0;
        _pto_cal_state_b0_ui = _PTO_CAL_STATE_CHANGE_DIRECTION;
        if( !_hdr_emerg_stop_debounced
750     || !seat_switch_bt_xp )
        {
            _timer02=0;
            _pto_cal_state_b0_ui = _PTO_CAL_STATE_FAILED;
755     }
        break;
    case _PTO_CAL_STATE_CHANGE_DIRECTION:
        _low_side_for_PTO_power_relay_on;              //turn on LSD to look for PTO switch
        _fwd_itest = rev_itest = _i_out_fwd_ma_b3_si = _i_out_rev_ma_b3_si = 0;
760     //if( _v_pto_rpm_b0 < 2)
        if( (++_timer02 > _calwait) && (_v_pto_rpm_b0 < 2) )     //Wait at least 3sec, more if pto not stopped
        {                                                        //Make sure it stops
765         _timer02=0;
```

*Fig. 18*

```
                _pto_cal_state_b0_ui = _PTO_CAL_STATE_REV_OFFSET;
            }
770         if(  !_hdr_emerg_stop_debounced
              || !seat_switch_bt_xp )
            {
                _timer02=0;
                _pto_cal_state_b0_ui = _PTO_CAL_STATE_FAILED;
            }
775     break;

case _PTO_CAL_STATE_REV_OFFSET:
            _low_side_for_PTO_power_relay_on;         //turn on LSD to look for PTO switch
            _fwd_itest=0;
780         //TBD - Get rid of disc specific values
            if
            (
               ((_6_cyl_pto_sickle_b_xp) && (_rev_itest <= _itest_max) && (_v_pto_rpm_b0 < 1000)
             || (_6_cyl_pto_sickle_b_xp) && (_rev_itest <= _itest_max) && (_v_pto_rpm_b0 < (unsigned int)(250/2.5)
            )
785         if( ++_timer02 > _cal_step )
            {
                _timer02=0;
                if( _6_cyl_pto_sickle_b_xp )
790                 _rev_itest += current_ma_b3_si( 1 );
                else
                    _rev_itest += current_ma_b3_si( 5 );
            }
795         if( ( _v_pto_rpm_b0 > 1 ) || _interactive_cal_proceed_flag_b0_uc )
            {
                _timer02=0;
                put_ee_pto_rev_offset_current_ma_b3_si( _rev_itest );
800             _pto_cal_value_ma_b3_si = EE_pto_rev_offset_current_ma_b3_si;
                _pto_cal_state_b0_ui = _PTO_CAL_STATE_REV_MAX;
            }
            else
            {
805             _timer02=0;
                _rev_itest = 0;
                _pto_state = _OFF;
                _pto_cal_state_b0_ui = _PTO_CAL_STATE_FAILED;      //if over max current reset everything and end cal
            }
810         if(  !_hdr_emerg_stop_debounced
              || !seat_switch_bt_xp )
            {
                _timer02=0;
815             _pto_cal_state_b0_ui = _PTO_CAL_STATE_FAILED;
```

//Calibrate the Reverse coil just the same as the

Fig. 19

```
        )
    break;
820 case _PTO_CAL_STATE_REV_MAX:
    _low_side_for_PTO_power_relay_on;        //turn on LSD to look for PTO switch
    _fwd_itest=0;
    //TBD - Get rid of disc specific values
825 if
    (
        !(_6_cyl_pto_sickle_b_xp) && (_rev_itest <= _itest_max) && (_v_pto_rpm_b0 < 1500)
        || (_6_cyl_pto_sickle_b_xp) && (_rev_itest <= _itest_max) && (_v_pto_rpm_b0 < (unsigned int)(500)  )
    )
    {
830     if( ++_timer02 > _cal_step )
        {
            _timer02=0;
            _rev_itest += current_ma_b3_si( 1 );
        }
835     //TBD - Base cal point on steady state velocity, so it is universal across header types
        if( _interactive_cal_proceed_flag_b0_uc
            || ( (_6_cyl_pto_disc_b_xp) && ( _v_pto_rpm_b0 >= velocity_rpm_b0_si(1000) ) ) //Take reverse secon
            || ( (_6_cyl_pto_sickle_b_xp) && ( _v_pto_rpm_b0 >= velocity_rpm_b0_si((unsigned int)(300)) ) ) )
        (
840         put_ee_pto_max_current_ma_b3_si( _rev_itest );
            pto_cal_value_ma_b3_si = EE_pto_rev_max_current_ma_b3_si;
            _timer02 = 0;
            pto_cal_state_b0_ui = _PTO_CAL_STATE_SHOW_REV_MAX;
        )
845 else
    (
850     _timer02=0;
        _rev_itest = 0;
        pto_state = _OFF;
        pto_cal_state_b0_ui = _PTO_CAL_STATE_FAILED;       //If over max current reset everything and end cal
    )
855 if(
        _hdr_emerg_stop_debounced
        || !seat_switch_bt_xp )
    (
        _timer02=0;
860     pto_cal_state_b0_ui = _PTO_CAL_STATE_FAILED;
    )
    break;
    case _PTO_CAL_STATE_SHOW_REV_MAX:
    if( ++_timer02 >= 300   )
    (
865     _timer02 = 0;
        pto_cal_state_b0_ui = _PTO_CAL_STATE_SUCCESSFUL;
    )
```

Fig. 20

```
        break;

870  case _PTO_CAL_STATE_CHECK_CONFIG:
     //_low_side_for_PTO_power_relay_off;        //turn off LSD to unlatch PTO switch
     _rev_itest = _fwd_itest = _i_out_rev_ma_b3_si = _i_out_fwd_ma_b3_si = 0;
     _pto_state = _OFF;
875  _pto_cal_msg = _cal_check_config_menu;
     if(++_timer02 > _calwait )
     {
        _timer02=0;
        _pto_cal_state_b0_ui = _PTO_CAL_STATE_EXIT;
880  }
     break;

case _PTO_CAL_STATE_FAILED:
     //_low_side_for_PTO_power_relay_off;        //turn off LSD to unlatch PTO switch
     //indicate cal failure with beep
885  Alarm_OneShot_1sec();
     _rev_itest = _fwd_itest = _i_out_rev_ma_b3_si = _i_out_fwd_ma_b3_si = 0;
     _pto_state = _OFF;
     _pto_cal_msg = _cal_failed_menu;
     if(++_timer02 > _calwait )
890  {
        _timer02=0;
        _pto_cal_state_b0_ui = _PTO_CAL_STATE_EXIT;
     }
895  break;

case _PTO_CAL_STATE_SUCCESSFUL:
     _low_side_for_PTO_power_relay_off;          //turn off LSD to unlatch PTO switch
     _rev_itest = _fwd_itest = _i_out_rev_ma_b3_si = _i_out_fwd_ma_b3_si = 0;
     _pto_state = _OFF;
900  _pto_cal_msg = _cal_success_menu;
     if(++_timer02 > _calwait)
     {
        _timer02=0;
        _pto_cal_state_b0_ui = _PTO_CAL_STATE_EXIT;
905  }
     break;

case _PTO_CAL_STATE_EXIT:
     //_low_side_for_PTO_power_relay_off;        //turn off LSD to unlatch PTO switch
910  _pto_cal_msg = _cal_ended_key_off;
     _rev_itest = _fwd_itest = _i_out_rev_ma_b3_si = _i_out_fwd_ma_b3_si = 0;
     _pto_state = _OFF;
     if(++_timer02 > _calwait)
     {
915     _timer02=0;
        //menu_change_focus(_calibrations_menu);
        //_pto_cal_state_b0_ui = _PTO_CAL_STATE_INIT;
     }
```

*Fig. 21*

```
        break;

920    case _pto_cal_state_DRAPER_CAL_INIT:
           _low_side_for_PTO_power_relay_on;              //Turn on LSD to look for PTO switc
           _pto_cal_msg = _pto_cal_running_menu;          //Show Calibration Message on Displ
           throttle_set_point( _throttle_setpt_rpm_b0_ui = 1300 );  //Increment Engine Speed
925        _i_inc = current_ma_b3_si( 8*2 );              //Preset incremental current value.
           _fwd_itest = current_ma_b3_si( 63 );           //Preset test current value to nom
           _draper_max_t_scans_b0_ui = _time_b0_ui2scans_sec_f(4.00);
           _timer02=0;                                    //Preset Timer to 0
           _header_max_test_rpm_b0_si = 725;              //Preset max time value
930        _pto_cal_state_b0_ui = _pto_cal_state_DRAPER_05; //Preset Header target speed.
        break;                                            //Next State
        case _pto_cal_state_DRAPER_04:
           _low_side_for_PTO_power_relay_on;              //Turn on LSD to look for PTO switc
           if( _i_inc < current_ma_b3_si( 0.500 ) )       //Are we at the end of the binary t
935           _pto_cal_state_b0_ui = _pto_cal_state_DRAPER_03;  //Complete for this erpm level
           else
              _pto_cal_state_b0_ui = _pto_cal_state_DRAPER_02;  //Not Complete for this erpm level
        break;
940     case _pto_cal_state_DRAPER_03:
           _low_side_for_PTO_power_relay_on;              //Turn on LSD to look for PTO switc
           if( _throttle_setpt_rpm_b0_ui == 2100 )        //All erpm levels mapped?
           {
              *(
945              (unsigned int*)
                 (
                    &ee_draper_1300_cal
                    + (( _throttle_setpt_rpm_b0_ui - 1300)/100 )
                 )
950           ) = _fwd_itest;                             //Update eeprom table
              _pto_cal_value_ma_b3_si = _fwd_itest;
              _timer02=0;                                 //Preset Timer to 0
              _pto_cal_state_b0_ui = _pto_cal_state_DRAPER_07;  //Next State
           }
955        else
           {
              *(
                 (unsigned int*)
                 (
                    &ee_draper_1300_cal
960                 + (( _throttle_setpt_rpm_b0_ui - 1300)/100 )
                 )
              ) = _fwd_itest;                             //Update eeprom table
              _pto_cal_value_ma_b3_si = _fwd_itest;       //Update displayed variable with la
              throttle_set_point( _throttle_setpt_rpm_b0_ui += 100 );  //Increment Engine Speed
              _i_inc = current_ma_b3_si( 4*2 );           //Preset incremental current value.
965           _fwd_itest -= current_ma_b3_si( 2.0 );      //Decrease test current
              _draper_max_t_scans_b0_ui = _time_b0_ui2scans_sec_f(4.00);  //Preset max time value
```

Fig. 22

```
 970         _timer02=0;
             _pto_cal_state_b0_ui = _pto_cal_state_DRAPER_05;      //Preset Timer to 0
                                                                    //Next State
         break;
 975     case _pto_cal_state_DRAPER_02:
             _low_side_for_PTO_power_relay_on;                      //Turn on LSD to look for PTO switc
             _i_inc /= 2;                                           //Halve the incremental current
             if( _header_test_rpm_b0_si > _header_max_test_rpm_b0_si )  //Header Speed Low or Hi?
                 _fwd_itest -= _i_inc;                              //Header Speed Hi...decrease curren
             else
 980             _fwd_itest += _i_inc;                              //Header Speed Lo...increase curren
             _timer02=0;                                            //Preset Timer to 0
             if( _draper_max_t_scans_b0_ui > _time_b0_ui2scans_sec_f(1.00) )  //Check settling time for header to
                 _draper_max_t_scans_b0_ui -= _time_b0_ui2scans_sec_f(1.00);  //Adjust settling time
             _pto_cal_state_b0_ui = _pto_cal_state_DRAPER_05;       //Next State
 985     break;
         case _pto_cal_state_DRAPER_05:
             _low_side_for_PTO_power_relay_on;                      //Turn on LSD to look for PTO switc
             if( ++_timer02 >= _draper_max_t_scans_b0_ui )          //Dwell for settling time
             (
 990             _timer02=0;                                        //Preset Timer to 0
                 sum_header_rpm_b0_sl=0;                            //Preset average header speed regis
                 _pto_cal_state_b0_ui = _pto_cal_state_DRAPER_06;   //Next State
         break;
         case _pto_cal_state_DRAPER_06:
 995         _low_side_for_PTO_power_relay_on;                      //Get The Average Header Speed
             if( ++_timer02 > _time_b0_ui2scans_sec_f(1.00) )       //Turn on LSD to look for PTO switc
             (                                                      //Average over a n-sec time period
                 _header_test_rpm_b0_sl =
1000             _sum_header_rpm_b0_sl/_time_b0_ui2scans_sec_f(1.00)  //Preset Timer to 0
                                                                    //Calc the average header speed
                 );
                 _pto_cal_state_b0_ui = _pto_cal_state_DRAPER_04;
             )
1005         else
                 sum_header_rpm_b0_sl += _v_pto_rpm_b0;             //Next state
         break;
         case _pto_cal_state_DRAPER_07:
1010         _low_side_for_PTO_power_relay_on;                      //Continue with average summation
             throttle_set_point( 900 );
             if( ++_timer02 > _time_b0_ui2scans_sec_f(3.00) )       //CALIBRATION COMPLETE...PREP FOR E
             (                                                      //Turn on LSD to look for PTO switc
                 _fwd_itest = 0;                                    //Return engine speed to low idle
1015             _timer02 = 0;                                      //Dwell for n-sec to display last c
                 _pto_cal_state_b0_ui = _PTO_CAL_STATE_SUCCESSFUL;
                                                                    //Turn hydrostat drive off
             )                                                      //Preset Timer to 0
                                                                    //Next State
1020     if( _update_display_flag_b0_uc == 1 )
```

*Fig. 23*

```
        menu_change_focus( _pto_cal_msg, _type_menu_e );   //Pass message pointer to display handler only on first
        _update_display_flag_b0_uc = 0;
      }
1025  if( _pto_cal_state_b0_ui != _prev_pto_cal_state_b0_ui )
        _update_display_flag_b0_uc = 1;

1030  _prev_pto_cal_state_b0_ui = _pto_cal_state_b0_ui;
      _interactive_cal_proceed_flag_b0_uc = 0;   //jpeters2004Apr201201  Default calibration proceed flag to zero _i_out_fwd_ma_b3_si = _fwd_itest;
      _i_out_rev_ma_b3_si = _rev_itest;
      // Output current passed to Icntrl Loop:
1035  Pto_Icntrl_setpt( _i_out_fwd_ma_b3_si, _i_out_rev_ma_b3_si );

Pto_Icntrl_state( CURRENT_CNTRL_state_uc_Pto_ICntrl );
    }
1040 /*********************************************************/
    void pto_calibration_proceed( void )
    {
      _interactive_cal_proceed_flag_b0_uc = 1;
1045 }
    /*********************************************************/
    void pto_goto_calibration( void )
    {
      _pto_cal_state_b0_ui = PTO_CAL_STATE_BEGIN;
1050  main_request_engine_running_cal();
    }
    /*********************************************************/
    void pto_calibration_exit( void )
    {
1055  _pto_cal_state_b0_ui = PTO_CAL_STATE_FAILED;
    }
    /*********************************************************/
1060 static void pid(void)
    {
      static signed int   _v_error_prev_rpm_b0;
      signed int          _v_error_rpm_b0;
      signed int          _tmp_si;
1065  signed long         _tmp_sl;
      static signed int   _Kp_b12,  _Ki_b12;

// #define _Kp_b12  _gain 0.2500  _b12
    // #define _Ki_b12  _gain 0.0025  _b12
1070 // #define _Kd_b12  _gain 0.0000  _b12    // Gain at which max error generates max plant output: 0.493
```

*Fig. 24*

```
1075   //rstros2002Sep152011 Changing Gains...Loop Tuning!
       // #define __Kp_b12    _gain 0.0700 _b12
       // #define __Kp_b12    _gain 0.0600 _b12 if( _6_cyl_pto_disc_b_xp )
1080   {
           __Kp_b12 = gain_b12_si( 0.00800 );    //jpeters2003Jul091423 experimental gain, lowered gain for st
           __Ki_b12 = gain_b12_si( 0.00040 );    //jpeters2003Jul091423 experimental gain, lowered gain for st
       }
       else            //CUT_TYPE_SICKLE
       {
1085       __Kp_b12 = gain_b12_si( 0.01000 );    //jpeters2003Jul051036 Experimental gains for HW365 sickle
           __Ki_b12 = gain_b12_si( 0.00040 );    //jpeters2003Jul051024 Lowered gains for HW365 sickle
       }

//#define __Kd_b12      _gain 0.0300 _b12
1090   #define __Kd_b12       gain_b12_si( 0.0300 )
       //rstros2002Sep152011 Changing Gains...Loop Tuning!

// Calc error
       //rstros2002Sep152011 Header Setpoint
1095   //rstros2002Sep191243
       // v_error_rpm_b0 = 2800/* v_setpt_rpm_b0*/ - _v_pto_rpm_b0;

_v_error_rpm_b0 = _v_setpt_rpm_b0 - _v_pto_rpm_b0;

// PID
1100   _Pcontrol_b12 = ((signed long)__Kp_b12) * _v_error_rpm_b0;
       _integrator_b12 += ( ((signed long)__Ki_b12) * _v_error_rpm_b0 );
       _Icontrol_b12 = _integrator_b12;
       _Dcontrol_b12 = ((signed long)__Kd_b12) * ( _v_error_rpm_b0 - _v_error_prev_rpm_b0 );
       _v_error_prev_rpm_b0 = _v_error_rpm_b0;
1105   _tmp_si = ( (signed int)( ( _Pcontrol_b12 + _Icontrol_b12 + _Dcontrol_b12 + ( (signed long)_i_offset_ma_b3_s // Clamp negative PID Values to zero
       if( _tmp_si < 0 )
           _tmp_si = 0;
1110
       _i_out_ma_b3_si = (unsigned int)_tmp_si ;

// Limit Integrator:
       // Calc max integrator value:
1115
       if( _6_cyl_pto_disc_b_xp )
           _tmp_si = (((signed long)current_ma_b3_si( 95 ) ) * gain_b9_si( 1.0 ) );    //jpeters2003Jul011533
       else
           _tmp_si = (((signed long)current_ma_b3_si( 150 ) ) * gain_b9_si( 1.0 ) );    //jpeters2003Jul011533
1120
       // Clamp at zero
```

Fig. 25

```
         if(__tmp_sl < 0 )
            __tmp_sl = 0;
1125    // Clamp integrator if required
         if(__integrator_b12 > __tmp_sl )
            __integrator_b12 = __tmp_sl;

// Limit current
1130     if(__i_out_ma_b3_si > __i_max_ma_b3_si )
            __i_out_ma_b3_si = __i_max_ma_b3_si;

//TBD - jpeters2004Aug100923 Do we need to further limit the current based on header type?
         if( _6_cyl_pto_disc_b_xp )
         {
1135        if( __i_out_ma_b3_si > current_ma_b3_si( 110 ) )
               __i_out_ma_b3_si = current_ma_b3_si( 110 );
         }
         else       //_ee_header_type_nbl = sickle
         {
1140        if( __i_out_ma_b3_si > current_ma_b3_si( 150 ) )
               __i_out_ma_b3_si = current_ma_b3_si( 150 );
         }

// Limit velocity:
1145     //   if( v_pto_rpm_b0 > __v_MAX_RPM_b0 )
         //      __i_out_ma_b3_si = (__i_out_ma_b3_si * gain_b12_si( 0.95 ) ) / BIN12;

// Save previous error
1150     __v_error_prev_rpm_b0 = __v_error_rpm_b0;
      }

1155  /******************************************************************/
      unsigned char pto_fwd_on_b_xp( void )
      {
         return( __pto_state == _FWD_ON || __pto_state == _VFWD );
1160  }

/******************************************************************/
      static signed int __pto_disc_setpt_to_current_ma_b3_si(signed int __setpt_rpm_b0_si)
      {
1165    /*
         DESCRIPTION: This function returns the predicted current necessary to operate
                      a disc header at the provided header speed with the current engine
                      speed.

1170                  I = ( Disc / 40 ) + Ioffset + ( (1.5/40)*(2150 - Eng) )

```
1175      static signed int __temp, __icmd_ma_b3_si;

//   __temp = ( (signed int)( ( (float)(__setpt_rpm_b0_si) ) * BIN3 / 40 ) + EE_pto_fwd_offset_current_ma_b3_si );
     __temp =
1180        (signed int)
          (
            (
              __setpt_rpm_b0_si
1185        )
          )
          / 5   //(*BIN3/40)
        )
        + EE_pto_fwd_offset_current_ma_b3_si
1190    );
//rps2004sep151110...remove rt fp calc...Jeremy Check!!!   //Calculate the nominal current needed at 2150 En
1195 // if( engine_v_eng_rpm_b0.filtered < 2150 )
//      __icmd_ma_b3_si = __temp + (signed int)( ( 2150 - (float)(engine_v_eng_rpm_b0.filtered) )*( 1.5 * BIN3 / 40
     __icmd_ma_b3_si =
       __temp
       + (signed int)
         (
1200       (
             2150
             - (unsigned int)(engine_v_eng_rpm_b0.filtered)
           )
1205       * (unsigned char)(1.5 * BIN3)
         )
         / 40
       );
       //rps2004sep151110...remove rt fp calc...Jeremy Check!!!
1210  else
       __icmd_ma_b3_si = __temp;

//jpeters2004Aug311216
      //TBD - Limit test?
1215  return(__icmd_ma_b3_si);
}

/*****************************************************/
1220 static signed int _pto_draper_setpt_to_current_ma_b3_si()
{
  /*
  DESCRIPTION:
  */
```

Fig. 27

```
        /*
        Damp the engine rpm input to avoid oscillations
1225    */
        __eng_rpm_b0.raw_ul = (unsigned long)engine_v_eng_rpm_b0.filtered;
1230    LONG_FILTER128( __eng_rpm_b0 )

return( _erpm_to_i((unsigned int)__eng_rpm_b0.filtered_ul));
        )
1235    /************************************************************/
        static unsigned int _erpm_to_i(unsigned int X)
        (
        /*
        Description:
1240       INPUT:  ERPM
           OUTPUT: Current
        */
1245    return( UFOXW(FN1, X) );
        )
```

Fig. 28

APPARATUS AND METHOD TO CALIBRATE A DRAPER ON AN AGRICULTURAL HEADER ON AN AGRICULTURAL WINDROWER

This application claims the benefit of U.S. Provisional Application No. 60/699,551, filed Jul. 15, 2005.

TECHNICAL FIELD

The present invention relates to agricultural windrowers and, more particularly, to apparatus and a method for calibrating a draper header on a windrower.

BACKGROUND OF THE INVENTION

U.S. Pat. No. 6,901,729, is incorporated herein by reference in its entirety. U.S. Provisional Application No. 60/699, 551, filed Jul. 15, 2005, is also incorporated herein by reference in its entirety.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Briefly, the arms comprise elements of a lift and flotation mechanism or mechanisms operable for setting a height of the header above the ground or other surface over which the windrower moves, the flotation permitting the header to ride lightly up and over rises in the terrain during field operation.

Headers are typically available in a variety of configurations. Common elements of different headers include cutters operable for severing crops from the field. One typical cutting mechanism is a sickle cutter which includes a row of knives which extend across the width of the header and which are powered to move reciprocally sidewardly relative to a sidewardly extending array of fixed knives or bars, thereby effecting a cutting action. A typical cutting speed for a sickle type cutter is about 1500 to 1800 strokes per minute. Additional driven elements of a header can include elements for conveying cut crop material, such as a system of draper belts configured and operable for conveying the cut crop material sidewardly toward the center of the header, or side of the header.

The cutters and draper belts can be commonly powered using a fluid drive, such as a fluid power takeoff (PTO). A pump driven by the engine of the tractor provides pressurized fluid to the PTO system. Fluid conduits, such as hoses, connect the PTO system with fluid motors of the fluid drive. The pump can be of variable displacement, the pressurization and direction of fluid flow, and thus the speed and direction of operation of the cutters and draper belts, being controlled by solenoids. Varying electrical current signals are utilized for operating the solenoids, for operating the header at the desired speed and in the desired direction, and the electrical current required for driving the header at a selected speed would need to be known, such that the controller controlling the solenoids can apply the correct current responsive to an operator command, or when conditions change, such as a change in speed of the engine driving the pump. As an example, if a particular current signal is applied to the solenoids for the engine operating at a given speed, and the engine speed is subsequently increased or decreased, the fluid flow generated by the pump will correspondingly change. If the fluid flow increases, the excess may be diverted to tank via a diverter or pressure relief valve and be subjected to undesirable heating. A tractor, and thus the PTO system, may be configured for use with any of a variety of different headers having different current level requirements for driving the cutters and drapers.

Therefore, it would be desirable to have an apparatus and method which enables calibrating PTO current values with an operating speed for a given header, and to facilitate the ability to maintain the current at the level required for achieving desired header performance under varying conditions such as varying engine speeds.

SUMMARY OF THE DISCLOSURE

What is disclosed is an apparatus and method which enables calibrating signals for operating a PTO for desired header operation for a given header installed on a windrower, particularly a draper header, to facilitate precise control of the header using the signals, including under changing conditions such as changing engine speeds or the like.

According to a preferred aspect of the invention the method and apparatus utilizes a programmable control module in connection with at least one signal controlled device operable for controlling operation of the PTO, which signal controlled device is preferably a solenoid controlled pump. The displacement of the pump is variably controllable as a function of the signals, by varying a swash plate angle of the pump. The pump is preferably driven by an engine of the windrower and is thus subject to the effects of varying the engine speed, such as between a low idle speed and a higher operating or harvesting speed. More particularly in this regard, by increasing the engine speed, the pump speed will be increased, and if the swash plate angle is not correspondingly adjusted to decrease the displacement of the pump, the result will be greater pump output. Any pump output in excess of that necessary for operating the header at the prescribed speed will be diverted by a diverter or pressure relief valve to tank. This is undesirable, as it unnecessarily consumes engine power and heats the hydraulic fluid which can result in heat related breakdown and failure of components and fluid.

To avoid or limit these problems, the control module is programmed as part of an automatic calibration routine for controlling the speed of the engine at a plurality of predetermined engine speeds, respectively; and while the speed of the engine is controlled at each of the predetermined engine speeds:

outputting an initial control signal to the signal controlled device having a predetermined initial signal value within a predetermined signal range for the engine speed;

determining an operating speed of the header resulting from the outputted initial control signal;

comparing the operating speed of the header resulting from the outputted initial control signal to a predetermined target speed value for the header, and:

if the operating speed of the header resulting from the outputted initial control signal is equal to the target speed value, storing information representative of the initial signal value; and if the operating speed of the header resulting from the outputted initial control signal is not equal to the target speed value, then calculating and outputting at least one changed control signal to the signal controlled device having a signal value within the predetermined range and incrementally greater or less than the initial control signal value, for changing the operating speed of the header so as to equal the target speed value, and storing information representative of the signal value of the changed control signal for operating the header at the target speed.

As a result, a map of control signal values for operating the header at the target speed for a range of engine speeds is developed. Subsequently during operation, the map can be utilized for controlling the header at the target speed, and for calculating control signal values for operating the header at speeds other than the target speed.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a written listing of steps of the preferred program of the invention;

FIG. 5 is a written listing of further steps of the preferred program of the invention;

FIG. 6 is a written listing of still further steps of the preferred program of the invention;

FIG. 7 is a written listing of still further steps of the preferred program of the invention; and FIG. 8 is a written listing of still further steps of the preferred program of the invention FIG. 9 is a written listing of steps of the preferred program of the invention;

FIG. 10 is a written listing of further steps of the preferred program of the invention;

FIG. 11 is a written listing of still further steps of the preferred program of the invention;

FIG. 12 is a written listing of still further steps of the preferred program of the invention; and FIG. 13 is a written listing of still further steps of the preferred program of the invention;

FIG. 14 is a written listing of still further steps of the preferred program of the invention;

FIG. 15 is a written listing of still further steps of the preferred program of the invention;

FIG. 16 is a written listing of still further steps of the preferred program of the invention;

FIG. 17 is a written listing of still further steps of the preferred program of the invention;

FIG. 18 is a written listing of still further steps of the preferred program of the invention;

FIG. 19 is a written listing of still further steps of the preferred program of the invention;

FIG. 20 is a written listing of still further steps of the preferred program of the invention;

FIG. 21 is a written listing of still further steps of the preferred program of the invention;

FIG. 22 is a written listing of still further steps of the preferred program of the invention;

FIG. 23 is a written listing of still further steps of the preferred program of the invention;

FIG. 24 is a written listing of still further steps of the preferred program of the invention;

FIG. 25 is a written listing of still further steps of the preferred program of the invention;

FIG. 26 is a written listing of still further steps of the preferred program of the invention;

FIG. 27 is a written listing of still further steps of the preferred program of the invention; and FIG. 28 is a written listing of still further steps of the preferred program of the invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
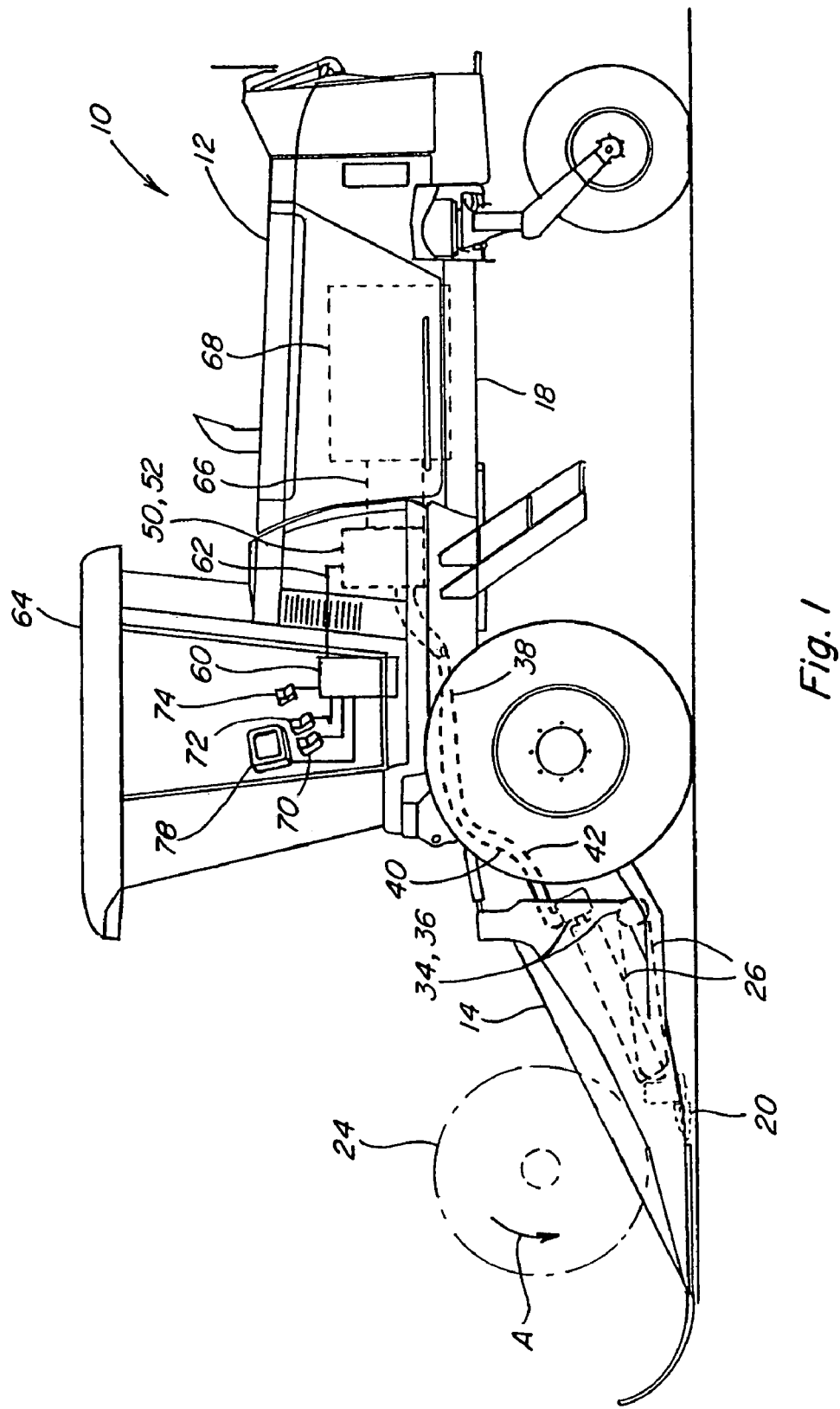
FIG. 1 is a side elevational view of a crop harvesting machine of the type with which the invention may be used, showing a header including a sickle cutter in connection with apparatus of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of a frame 18 or chassis of the tractor 12. The header may be of generally any suitable construction and design, and will include crop-harvesting mechanisms, such as a sickle cutter 20. Header 14 additionally includes a reel 24 rotatable at a fixed or variable speed, as denoted by arrow A, for directing crops toward header 14 for harvesting by sickle cutter 20. A draper 26 comprising endless belts is disposed and operable for directing the harvested crop toward the center of header 14.

Sickle cutter 20 of header 14 includes a row of knives extending sidewardly across the lower front of header 14 and reciprocally driven in the sideward direction, by at least one drive 34 which preferably includes a fluid motor 36. Fluid motor 36 is connected in fluid communication with a PTO 38 of tractor 12, by fluid lines 40 and 42, for receiving pressurized fluid therefrom, for powering the reciprocating movement of the sickle knives, in the well known manner. Reel 24 and draper 26 can also be fluid driven, reel 24 by another fluid PTO, and draper 26 also by PTO 38.

Header 14 is removably mountable on a pair of lower arms which extend forwardly from frame 18 of tractor 12, and which are movable upwardly and downwardly for positioning the header at a desired cutting height, or at an elevated transport position, using one or more lift cylinders (not shown), also in the well known manner. The upper end of the header is connected to frame 18 by an upper or center link connected to a mechanism operable for tilting the header to a desired orientation, again, in the well known manner.

A typical operating speed for sickle 20, will be about 1800 cycles per minute. Because header will be interchangeable on windrower 10 with other headers, and receive pressurized fluid from and are controlled by PTO 38, as noted above, it is desirable to have a capability to calibrate the output of PTO 38 with the output of the header for optimizing header performance, and for providing a capability for adjusting to changing conditions, particularly changing engine speed.

PTO 38 includes a PTO driveline 50 including a fluid valve arrangement 52 controllably operable for directing pressurized fluid through fluid lines 40 and 42 as desired or required for powering a header, such as header 14 or header 16, connected to windrower 10.

Figure 2:
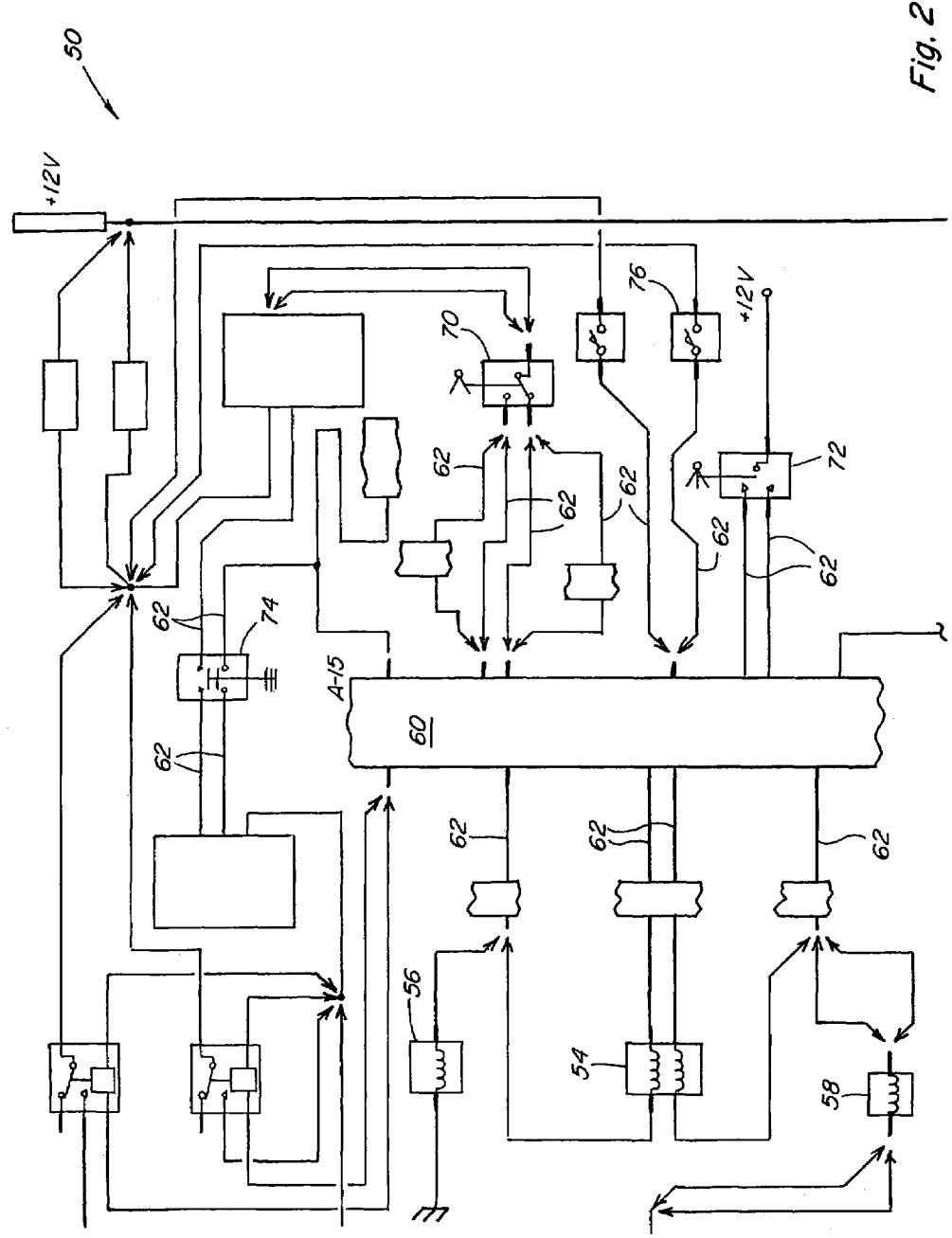
FIG. 2 is a schematic of a PTO driveline of the machine of FIG. 1.

Referring also to FIG. 2, which is a schematic of PTO driveline 50, the flow of pressurized fluid to valve arrangement 52 is generated by a variable displacement pump 66, the displacement of which is determined by the angle of an internal swash plate, the angle being controlled by a header PTO forward/reverse solenoid 54. In another embodiment, the pump can be a fixed displacement pump operated by a header PTO forward solenoid 56 and a header PTO reverse solenoid 58. Solenoid 54 is controlled by an electrical signal, the electrical current value of which can be very precisely controllably varied through a range between zero and a greater amount. PTO driveline 50 includes a programmable control module 60 connected to header PTO forward/reverse solenoid 54 by suitable conductive paths 62, which can be, for instance, wires of a wiring harness. Control module 60 is preferably a conventionally constructed and operable microprocessor based tractor control module, or the like, suitably located on tractor 12, such as in an operator cab 64. Pump 66 is driven by an engine 68 of tractor 12, in the well known manner. Pump 66 is operable for providing fluid pressurized to predetermined system pressure by operation of engine 68 at at least a low idle speed, which is about 900 rpm.

Other pertinent elements of PTO driveline 50 include a header PTO switch 70 selectably operable by an operator for selecting a forward or reverse direction of operation of the PTO; a header speed switch 72 selectably operable by an operator for increasing or decreasing the speed of operation of the header; a header PTO emergency stop switch 74; a seat switch 76; and a display device 78, which can be, for instance, an interactive touch screen device or the like which can be automatically adapted or turned on for receiving operator inputs, each of switches 70, 72, 74 and 76, and device 78, being located in operator cab 64 and connected to the control module 60 via suitable conductive paths 62. Electrical power is provided in the normal manner from an electrical system of the tractor, as represented by the +12 V connections in the schematic.

Other aspects of windrower 10 include a propulsion driveline including fluid motors in connection, respectively, with drive wheels, which are differentially operated for effecting steering movements. The differential operation of the fluid motors of the driveline, as well as the travel speed, is effected by varying the displacement of fluid pumps in connection with the respective fluid motors of the driveline. A typical range of operating speeds of engine 68 of windrower 10 will be from about 1300 rpm, which represents a low speed, to about 2200 or 2300 rpm, which represents a typical normal operating speed.

Because pump 66 of PTO driveline 50 is driven by engine 68, operation of engine 68 at different speeds will result in operation of pump 66 at different speeds. This will cause pump 66 to generate different fluid flow outputs as the speed of the engine changes, if the displacement of the pump is not correspondingly adjusted for maintaining a particular fluid flow level. When a header 14 is installed, if an amount of fluid flow in excess of that required for operating the header is generated by PTO 38, the excess flow will be directed through a diverter or pressure relief valve to tank. This is inefficient, as the generation of the excess flow requires engine power, and the fluid is unnecessarily heated, thereby subjecting it and related componentry to heat related problems, which is undesirable. As noted above, as an alternative, it would be desirable to have an automatic capability to determine an optimal fluid flow for operating a header 14 installed on windrower 10, then to maintain that optimal fluid flow, regardless of variations in engine speed, that is, to provide a capability to vary the displacement of pump 66 as the speed of engine 68 changes, in a manner for maintaining optimal or near optimal fluid flow conditions.

Figure 3:
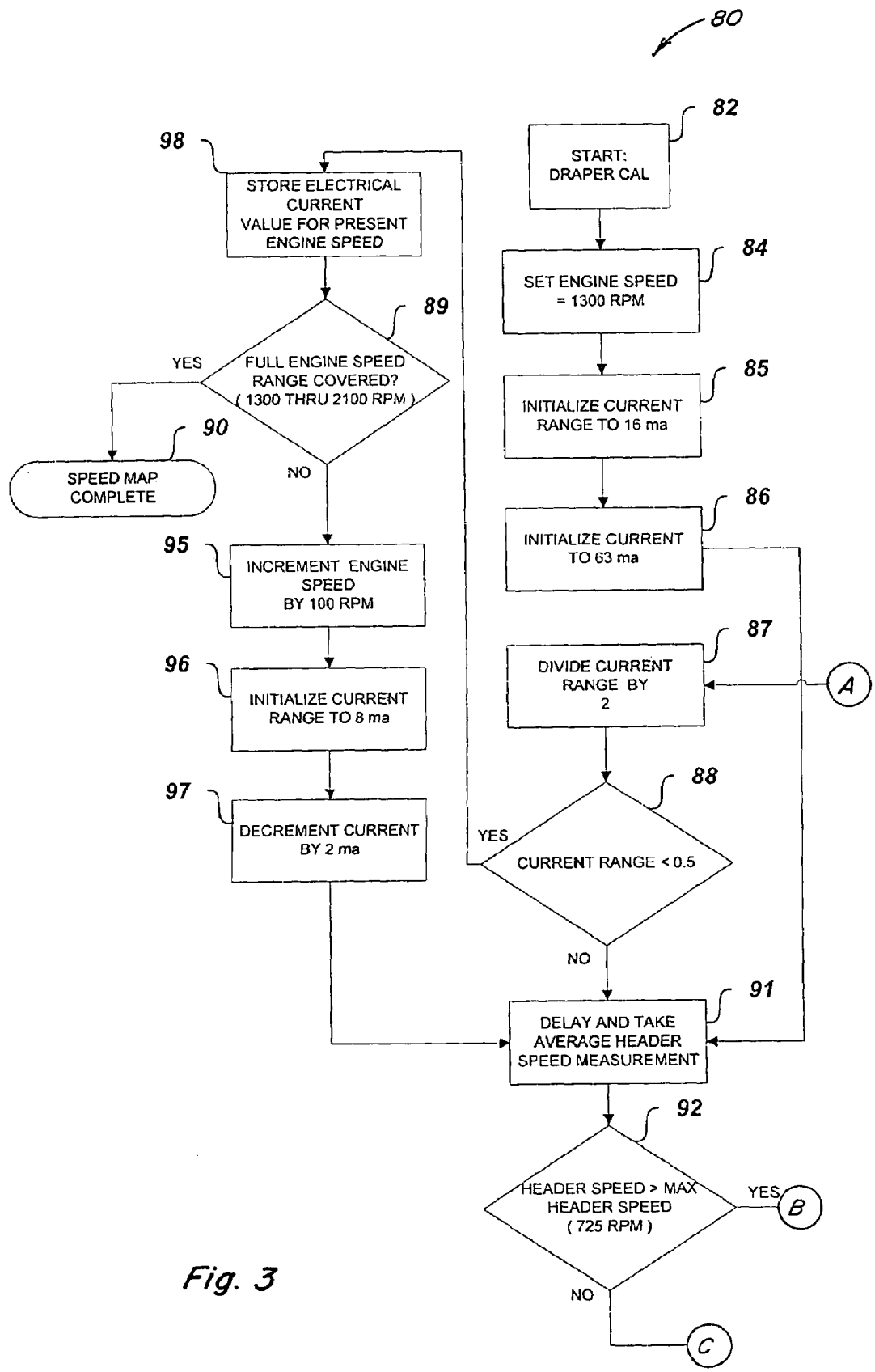
FIG. 3 is a high level flow diagram of steps of a preferred embodiment of a computer program of the invention.
Figure 3A:
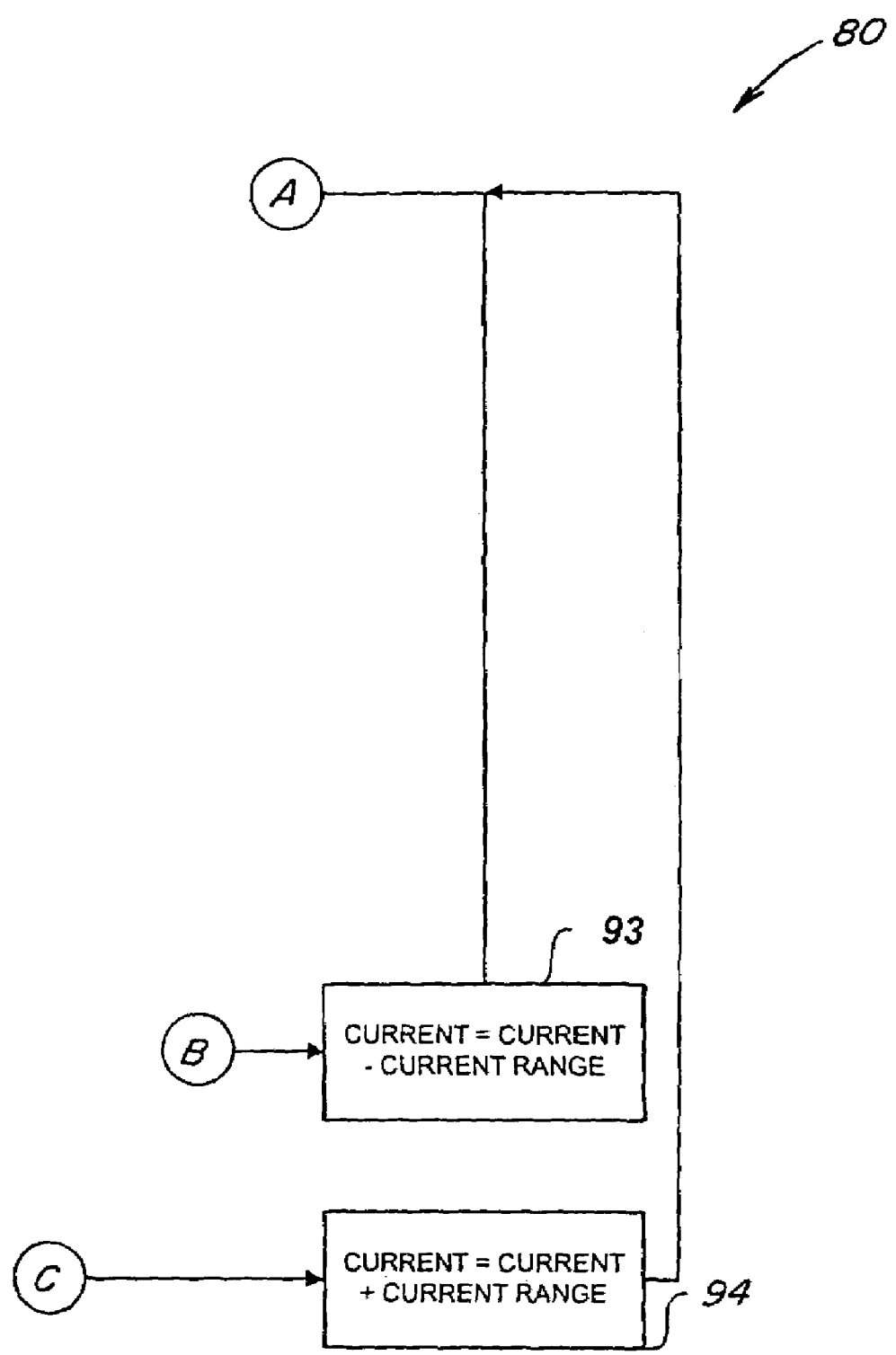
FIG. 3a is a continuation of the high level flow diagram of FIG. 3.

Referring also to FIGS. 3 and 3a, a flow diagram 80 illustrating steps of a method of the instant invention for calibrating PTO 38 for operation with a header, such as header 14, is shown, for determining the control signals for providing a desired level of fluid flow to the header at any of a predetermined number or range of engine operating speeds. The steps of flow diagram 80 are preferably programmed in and executable by control module 60 at appropriate times, such as, but not limited to, when a header 14 is first installed, or after a repair or service affecting stored register values. When the operator invokes a calibration, or re-calibration, control module 60 will output a message on the screen of display device 78 that calibration is initiating, and request an action by the operator to enable the header 14, via the two action PTO switch 74. At block 82 control module 60 initiates the calibration routine. At block 84, control module 60 sets the engine speed at one of a plurality of predetermined engine speeds. A first variable, being the electrical current range, is initialized to 16 ma as denoted by block 85. With the engine at the selected speed, control module 60 applies or outputs an initial control signal to solenoid 54 having a predetermined initial signal value within a predetermined signal range for the engine speed, as denoted at block 86. Control module 60 then monitors the resulting header speed, as denoted at block 91. As denoted at decision blocked 92, control module 60 then compares the operating speed of the header resulting from the outputted initial control signal to a predetermined target speed value for the header, here, which is preferably 725 rpm.

Control module 60 will determine if the speed is greater than the target value, as denoted at decision block 92. If yes, control module 60 will follow balloon B to proceed to calculate an incrementally changed control signal value, as denoted at block 93, and following balloon A to block 87, and output or apply the changed signal value to the pump solenoid 54. If no, control module 60 will proceed following balloon C to calculate an incrementally changed control signal value, as denoted at block 94, and output or apply the changed signal value to the pump solenoid 54. Following balloon A, the electrical current range is then divided in half, as denoted by block 87. The electrical current range is then compared to the minimum electrical current resolution required, 0.5 ma as denoted by decision block 88. The process then repeats, starting at block 91 until the electrical current range is less than the minimum electrical current range resolution, 0.5 ma, as denoted by decision block 88. When the minimum electrical current range resolution requirement is met, the electrical current value, corresponding to a header speed of 725 rpm at the present commanded engine speed, is stored as denoted by block 98. Control module 60 then proceeds to determine if the signal map is complete, as denoted at decision block 89. If not, control module 60 will proceed to set the engine speed at the next incremental value, as denoted at block 95. Additionally, the electrical current range is re-initialized to 8 ma, as denoted by block 96, and the present electrical current value is reduced by 2 ma, as denoted by block 97.

The process then continues, starting at block 91 until the full range of engine speeds are mapped, at which time the process concludes when the engine speed is equal to 2100 rpm, as denoted in decision block 89.

Control module 60 will preferably utilize a binary tree algorithm to increment or decrement, respectively, the control signal value so as to move the resultant header speed toward the target value, such that successive increments or decrements will be halved, and the header speed will be progressively moved toward the target value, until it is reached.

As a result of execution of the calibration routines of the instant invention, registers of control module 60 will contain information representative of the electrical current values required to be directed to solenoid 54 for providing fluid flow for effecting operation of header 14 at the target operating speed thereof. These values can then be used by control module 60, for determining new current values for achieving pump swash plate angles required for providing the optimal fluid flow to the header for a variety of engine speeds, such that flow diverted to tank by the diverter or pressure relief valve, and the attendant problems associated with it, are minimized.

Referring also to FIGS. 4-28, lines of code of an actual computer program embodying the above described steps of the method of the invention is disclosed. The notes accompanying the lines of code describe many features of the method of the invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method of calibrating a PTO for driving a header of an agricultural windrower, comprising steps of:
    proving a window including a PTO having a signal controlled device for controlling pressurized fluid flow through the PTO to a header for controlling a speed of operation of the header;
    providing a programmable control module operable for controlling a speed of an engine of the windrower, the programmable control module being connected with the signal controlled device and operable for outputting control signals thereto having variable signal values, and;
    wherein the control module is program as part of a calibration routine for automatically:
    controlling the speed of the engine at a plurality of predetermined engine speeds, respectively; and
    while the speed of the engine is controlled at each of the predetermined engine speeds:
    outputting an initial control signal to the signal controlled device having a predetermined initial signal value within a predetermined signal range for the engine speed;
    determining an operating speed of the header resulting from the outputted initial control signal;
    comparing the operating speed of the header resulting from the outputted initial control signal to a predetermined target speed value for the header, and:
    if the operating speed of the header resulting from the outputted initial control signal is equal to the target speed value, storing information representative of the initial signal value; and
    if the operating speed of the header resulting from the outputted initial control signal is not equal to the target speed value, then calculating and outputting at least one changed control signal to the signal controlled device having a signal value within the predetermined range and incrementally greater or less than the initial control signal value, for changing the operating speed of the header so as to equal the target speed value, and storing information representative of the signal value of the changed control signal for operating the header at the target speed.

2. The method of claim 1, wherein the signal controlled device comprises a solenoid controlled fluid pump and the control signals comprise electrical currents.

3. The method of claim 1, wherein if more than one of the changed control signals is required for changing the operating speed of the header so as to equal the target speed value, then successive ones of the changed control signals will be calculated so as to have signal values that differ by successively smaller amounts.

4. The method of claim 3, wherein the signal values of the successive ones of the change control signals will be calculated using a binary tree algorithm.

5. The method of claim 1, wherein if more than one of the changed control signals is required for changing the operating speed of the header so as to equal the target speed value, then successive ones of the changed control signals will be calculated so as to have signal values that differ from the target speed value by decreasing amounts.

6. The method of claim 1, wherein the control module will determine that the calibration routine is complete when information representative of an outputted control signal for each of the engine speeds has been stored.

7. The method of claim 1, wherein the header comprises a draper header and the target speed value comprises a speed of about 725 rpm.

8. The method of claim 1, wherein the plurality of engine speeds comprise speeds of between about 1300 rpm and about 2100 rpm.

9. Apparatus for calibrating a PTO of an agricultural windrower, comprising:
    a signal controlled device for controlling pressurized fluid flow through the PTO to a header for controlling a speed of operation of the header;
    a programmable control module operable for controlling a speed of an engine of the windrower, the control module being connected to the signal controlled device and operable for outputting control signals thereto having variable signal values;
    wherein the control module is programmed as part of a calibration routine for automatically controlling the speed of the engine at a plurality of predetermined engine speeds, respectively, while outputting an initial control signal to the signal controlled device having a predetermined initial signal value within a predetermined signal range for the engine speed and determining if an operating speed of the header resulting from the outputted initial control signal equals a predetermined target speed value for the header, and, if not, then calculating and outputting at least one changed control signal to the signal controlled device having a signal value within the predetermined range and incrementally greater or less than the initial control signal value, for changing the operating speed of the header so as to equal the target speed value.

10. Apparatus of claim 9, wherein the signal controlled device comprises a solenoid controlled fluid pump and the control signals comprise electrical currents.

11. Apparatus of claim 9, wherein the control module is programmed such that if more than one of the changed control signals is required for changing the operating speed of the header so as to equal the target speed value, then the control module will calculate successive ones of the changed control signals to have signal values that differ by successively smaller amounts.

12. Apparatus of claim 11, wherein the cultural module is programmed to calculate the signal values of the successive ones of the changed control signals using a binary tree algorithm.

13. Apparatus of claim 9, wherein the control module is programmed such that if more than one of the changed control signals is required for changing the operating speed of the header so as to equal the target speed value, then the control module will automatically calculate successive ones of the changed control signals so as to have signal values that differ from the target speed value by decreasing amounts.

14. Apparatus of claim 9, wherein the control module is programmed to determine that the calibration routine is complete when information representative of an outputted control signal for each of the engine speeds has been stored.

15. Apparatus of claim 9, wherein the header comprises a draper header and the target speed value comprises a speed of about 725 rpm.

16. Apparatus of claim 9, wherein the plurality of engine speeds comprise speeds of between about 1300 rpm and about 2100 rpm.

* * * * *